(12) United States Patent
Graham et al.

(10) Patent No.: US 7,800,672 B1
(45) Date of Patent: Sep. 21, 2010

(54) UNIT CELL COMPRESSION CIRCUIT AND METHOD

(75) Inventors: Roger W. Graham, Santa Barbara, CA (US); John T. Caulfield, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 1469 days.

(21) Appl. No.: 11/125,510

(22) Filed: May 9, 2005

(51) Int. Cl.
*H04N 5/335* (2006.01)
*H04N 3/14* (2006.01)

(52) U.S. Cl. .................................. 348/307; 250/208.1
(58) Field of Classification Search ......... 348/296–310; 250/208.1
See application file for complete search history.

(56) References Cited

U.S. PATENT DOCUMENTS

| | | | | |
|---|---|---|---|---|
| 2,632,058 A | 3/1953 | Gray | | 375/242 |
| 3,303,359 A | 2/1967 | Des Brisay, Jr. | | 327/132 |
| 4,509,845 A | 4/1985 | Mizokami | | 396/187 |
| 5,128,534 A | 7/1992 | Wyles et al. | | 250/208.1 |
| 5,303,027 A * | 4/1994 | Kuderer et al. | | 356/328 |
| 5,886,660 A | 3/1999 | Lowenstein | | 341/166 |
| 6,144,330 A | 11/2000 | Hoffman et al. | | 341/166 |
| 6,194,703 B1 * | 2/2001 | Kuderer | | 250/214 R |
| 6,473,122 B1 | 10/2002 | Kanekal | | 348/340 |
| 6,727,486 B2 | 4/2004 | Choi | | 250/208.1 |
| 7,616,242 B2 * | 11/2009 | Ando et al. | | 348/301 |
| 2004/0021787 A1 * | 2/2004 | Cho | | 348/308 |
| 2004/0036784 A1 * | 2/2004 | Bock | | 348/308 |

* cited by examiner

*Primary Examiner*—Sinh Tran
*Assistant Examiner*—Anthony J Daniels
(74) *Attorney, Agent, or Firm*—Harrington & Smith

(57) ABSTRACT

A circuit includes a compression sub-circuit having an input and an output for dumping excess current, a voltage bucket, and a current source. The voltage bucket, such as a capacitor, and the current source, such as a photodetector, are coupled in parallel to the input of the compression sub-circuit. Preferably, the compression sub-circuit is a single FET having a gate voltage selected to allow current to bleed off or be dumped through the FET as the capacitor approaches being full, and dumps excess photocurrent when the capacitor is full. The capacitor is nearly full when it is at least three quarters full, and is substantially full or approaching being full when it is at least 90% of capacity. In a photodetector embodiment, one plate of the capacitor is coupled to the FET and the opposed second plate is coupled to a ramping voltage circuit.

10 Claims, 3 Drawing Sheets

UNIT CELL COMPRESSION CIRCUIT AND METHOD

STATEMENT OF GOVERNMENT RIGHTS

This invention was made with government support under contract no. N66001-02-C-8078 awarded by the Department of the Navy. The government has certain rights in this invention.

CROSS-REFERENCE TO RELATED APPLICATION

This application is related to U.S. patent application Ser. No. 11/125,509, filed on May 9, 2005, the contents of which is hereby incorporated by reference.

FIELD OF THE INVENTION

The present invention relates to analog-to-digital circuits ADCs, and is a compression/limiter circuit and method for compressing a signal range converted by such a circuit. It is particularly useful for use in each unit cell of an array of detector elements such as focal plane arrays FPAs.

BACKGROUND

A focal plane detector array comprises numerous detector unit cells or pixels, each of which converts incident electromagnetic radiation to an electric signal. The unit cells output an analog signal corresponding to scene radiation sensed by the particular detector element. These analog signals must be converted to digital in order to be combined and efficiently processed to resolve an image of a scene being viewed by the array of detector elements. It is noted that focal plane detector arrays are disposed within a temperature-controlled chamber to minimize localized heat that might otherwise interfere with the intended scene radiation as noise. Excessive power dissipation, such as by power inefficient amplifiers and ADCs mounted in or near the chamber, places an additional burden on the Dewar or thermoelectric cooling elements that are employed for regulating chamber temperature. The particular aspects of prior art ADCs and an improved (single slope) ADC are detailed in the related application cross-referenced above.

The ADC of the incorporated reference is within that class of ADCs termed single slope. In general, a single slope ADC operates on the following principle. An internal (voltage) ramp is generated to begin the conversion from analog, and a counter is enabled to count pulses from a stable clock. When the ramp voltage equals a trip of input level, a comparator stops the counter. The output of the counter is proportional to the input level, but is digital. At the end of the conversion the ramp resets (such as by discharging an integrating capacitor), resets the counter, and another cycle begins.

While single slope ADCs are relatively simple, they are traditionally not used where high accuracy is required because they are limited by the stability and accuracy of the capacitor and comparator. Traditionally, dual slope or other types of ADCs have been used to overcome the precision problem of single slope ADCs rather than use very high quality capacitors and comparators in the single slope solution. Dual slope ADCs have traditionally proven more cost effective and more precise. However, they are not quite as fast as single slope ADCs.

In the field of electronic imaging, such as thermal or IR sensing by a multitude of arrayed detector elements whose individual signals are combined into a comprehensive image for display or electronic analysis, speed and power are important considerations. Circuit speed is necessary for real-time imaging at high resolution. Low power is important for two reasons: to protect the detectors themselves from excessive heat, and to enable imaging with portable power. As to the former, the sensitivity of the detectors typically relies on the photosensitive field to lie within a chamber that is highly temperature controlled, in order that thermal noise not be sensed as the desired scene radiation. This is true for both cryogenic and non-cryogenic detectors. As to the latter, there is an increasing need for mobile imaging systems that rely on DC power (battery, fuel cell), especially in military applications such as unmanned aerial vehicles and night imaging equipment for individual soldiers. In the prior art, the predominant approach was to keep circuitry at the level of the individual detector element simple and perform signal-processing off-chip after combining signals from the various detector elements.

However, processing the signals after they are combined is greatly complicated over processing them individually at the level of the detector elements. Because there are typically thousands of detector elements in a single arrayed device, any circuitry at the detector element level implies that its element-level cost is multiplied by the number of elements in the array for an overall detector device. This balancing of cost versus signal-processing efficiency has weighed in favor of more complex signal processing in the past. One factor against processing at the detector element level is that the signals from the detector elements may vary over a broad range, leaving a tradeoff between simplicity and accuracy.

Related art that provides more context for the present invention includes the following co-owned patents: U.S. Pat. No. 5,751,005 to Wyles et al. and entitled "Low Crosstalk Column Differencing Circuit Architecture for Integrated Focal Plane Arrays; U.S. Pat. No. 6,040,568 to Caulfield et al. and entitled "Multipurpose Readout Integrated Circuit with In Cell Adaptive Non-Uniformity Correction and Enhanced Dynamic Range"; and also U.S. Pat. No. 6,587,001 to Wyles et al. and entitled "Analog Load Driver". As will be seen, these patents are not directed toward solving the specific problems addressed by the present invention.

The present invention represents one element in a solution to perform more signal processing at the level of the individual detector elements, or the unit cells, of an imaging array. It is particularly developed to be used in conjunction with that co-pending application that is cross-referenced and incorporated above.

SUMMARY OF THE INVENTION

This invention is in one aspect a circuit that includes a compression sub-circuit having an input and an output for dumping excess current, a voltage bucket, and a current source. The voltage bucket, such as a capacitor, and the current source, such as a photodetector, are coupled in parallel to the input of the compression sub-circuit. Preferably, the compression sub-circuit is a single FET having a gate voltage selected to allow current to bleed off or be dumped through the FET as the capacitor approaches being full, and dumps excess photocurrent when the capacitor is full. The capacitor is nearly full when it is at least three quarters full, and is substantially full or approaching being full when it is at least 90% of capacity. In a photodetector embodiment, one plate of the capacitor is coupled to the FET and the opposed second plate is coupled to a ramping voltage circuit.

The invention is, in another aspect, a circuit that includes an input node for providing an electrical current, storage means coupled to the input node for storing a finite amount of electrical energy, and bleedoff means for dumping current when the storage means is substantially full. The bleedoff means has an input coupled to the input node and to the storage means. In one embodiment, the storage means is an integrating capacitor and the bleedoff means is a single transistor.

In accordance with another aspect of the invention is an array of unit cells that are disposed on a contiguous substrate. The array may be as few as five by five, but is preferably greater than one hundred by one hundred for more advanced imaging applications over multiple spectral bands. Each unit cell includes a photocurrent input node, a capacitor having a first plate coupled to the photocurrent input node, and a compression sub-circuit. The compression sub-circuit is coupled to the capacitor first plate for bleeding off current from the photocurrent input node, at least when the capacitor is fully charged. In accordance with the preferred embodiment of the present invention, when (each of) the compression sub-circuits are in operation and processing a photocurrent from a detector, all current that is input at the input node during a single charge and dump cycle of the capacitor is either accumulated at the capacitor or passed through the compression circuit.

In accordance with another aspect, the present invention is a method of compressing a photocurrent. In the method, photocurrent is accumulated photocurrent in an electrical energy storage device such as a capacitor. Further, as a capacity of the electrical energy storage device is approached, additional photocurrent is bled off without dumping energy stored in the electrical energy storage device.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

DETAILED DESCRIPTION

Figure 1:
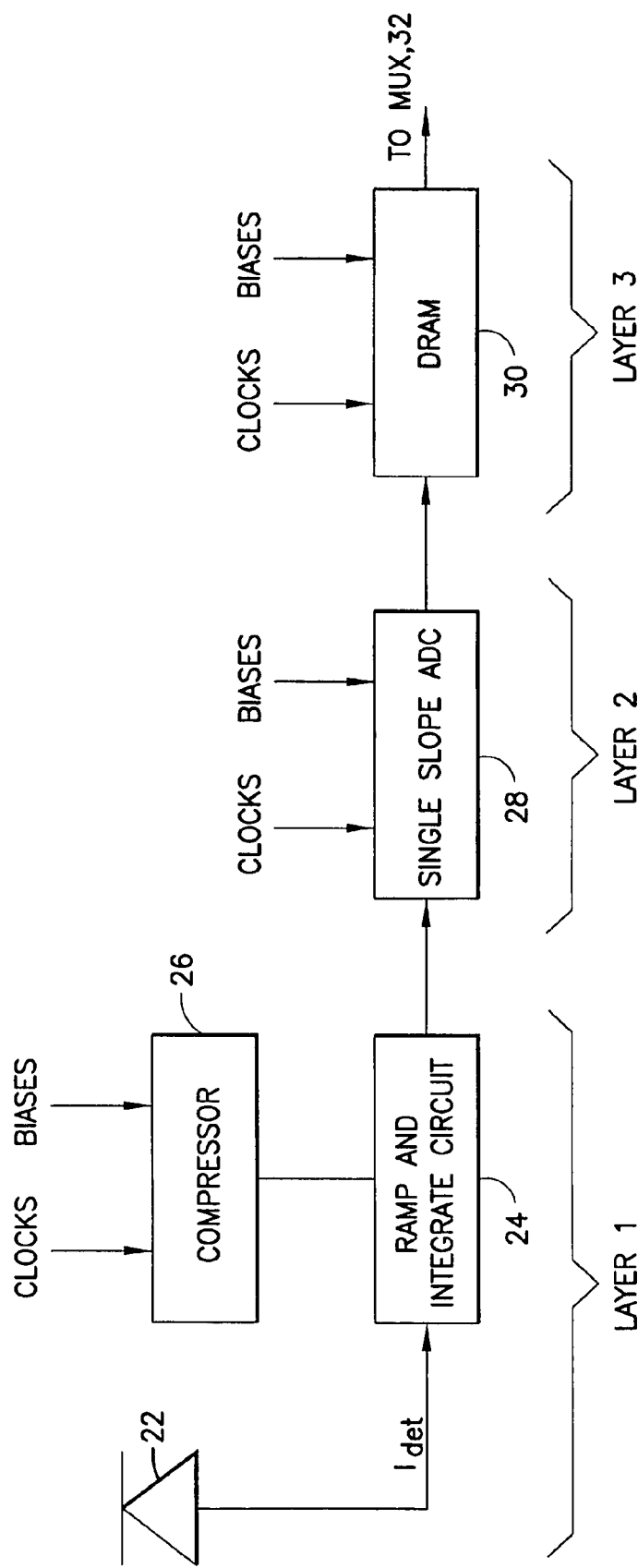
FIG. 1 is a high-level block diagram of a unit cell of a readout integrated circuit having an ADC according to the present invention disposed with each unit cell.

An overview of a particularly advantageous context for the inventive compression circuit is shown in block view at FIG. 1, a unit cell 20 of a readout integrated circuit ROIC that is preferably one of many disposed to match a detector pixel 22 of a focal plane array FPA. A typical detector element 22 is a photo detector that senses and converts infrared IR radiation and into an analog electrical signal that is manipulated by the ROIC unit cell 20. A variety of other devices may alternatively serve as the current source. Apart from the detector element 22 which is typically formed on a separate substrate (but shown with the ROIC unit cell 20 for context), each of the layers 1-3 represent different functional circuits, and also happen to correspond to different substrates on which CMOS circuitry is typically formed. The substrates for the circuitry of layers 1 and 2 are then paired, layer 2 is thinned, and layer 3 is added and thinned to result in an array of ROIC unit cells 20 on a single (composite) substrate, which may or may not include further circuitry such as a digital processor to multiplex and analyze the data. Many such unit cells are formed on a single substrate that is contiguous, that is, the unit cells share a common substrate.

The detector element 22 is typically formed on a HgCdTe substrate with protruding indium bumps for mating with circuitry layers, as known in the art. Common steps in forming detector elements 22 include masking, etching, disposing additional layers, and epitaxially growing layers. The detector elements 22 are generally sensitive to radiation within a wavelength band, such as short wavelength IR (about 1000-3000 nm), medium wavelength IR (about 3000-8000 nm), long wavelength IR (about 7000-14,000 nm), and very long wavelength IR (about 12,000-30,000 nm). Any particular array of detector elements may have all elements 22 sensitive to a common wavelength range, or may include elements 22 sensitive to one radiation band and other elements sensitive to a different band. Sensitivity to a radiation band refers to a maximum photosensitivity to the wavelength that lies within the band. Where the bands overlap as some bands above do, a particular detector element 22 is sensitive to both bands if its maximum photosensitivity occurs at a wavelength within the overlap. While IR wavelengths have been used as exemplary, detector elements 22 may be sensitive to wavelengths above or below the IR region.

The ROIC is typically formed on a silicon-based substrate and CMOS circuitry is formed via etching, growing, and disposing various layers of material on the substrate. Standard fabrication includes hybridizing the array of detector elements to the substrate defining the ROIC, some or all of the circuits of the ROIC may be made monolithically with the detector elements 22 rather than electrically coupled after being formed separately.

At layer 1, the detector pixel 22 outputs a current $I_{det}$ that is input into a voltage ramp and integrate circuit 24 that converts the input voltage $I_{det}$ to an integrating voltage. The particulars of such a device-level ramp and integrate circuit 24 are detailed in the above-incorporated related application. A compressor/limiter circuit 26 is also within ROIC layer 1 that uses, preferably, a single metal oxide semiconductor field effect transistor (MOSFET). The compressor circuit 26 serves to prevent the detector element 22 from de-biasing under certain conditions.

Novel aspects of the present invention may be found in layer 1 of FIG. 1, the compressor circuit 26. For context, a digital output of the ADC 28 is preferably stored, along with chronologically corresponding outputs from numerous other similar unit cells 20, in a DRAM stack 30. These stored digital values are then multiplexed 32 to resolve a temporal image from the array of unit cells 20.

Figure 2:
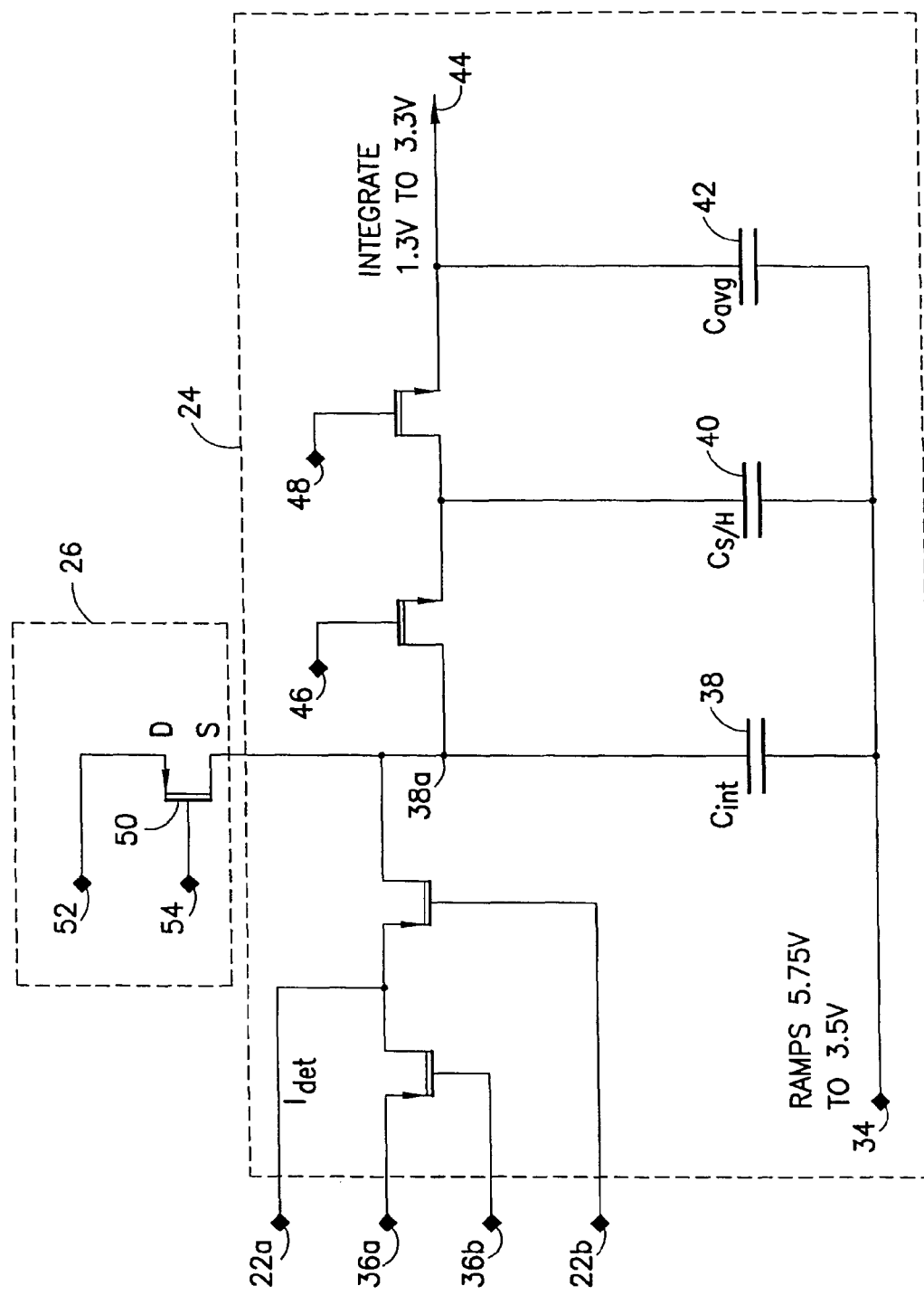
FIG. 2 is a device-level implementation of an integrate portion of the Ramp and Integrate circuit of FIG. 1 showing the compressor circuit according to a preferred embodiment of the present invention.

A circuit level diagram of the inventive compressor circuit 26 is shown in FIG. 2 in context with the detector output 22a and the integrate portion of the ramp and integrate circuit 24. The current source $I_{det}$ driving the ramp and integrate circuit 24 is a photocurrent from the detector 22. The output of the ramp and integrate circuit 24, which is input to the ADC circuit 28, is an integrated voltage, preferably integrated between 1.3V and 3.3V from a voltage ramping between 3.5 and 5.75 V.

FIG. 2 includes a test voltage node 36a and a test enable control 36b for testing and troubleshooting the circuit. Photocurrent $I_{det}$ from the detector 22 is applied at node 22a and controlled at 22b to allow only a threshold photocurrent to pass. The ramp voltage input at node 34 is applied in parallel to one plate of each of three capacitors: an integrating capacitor 38 ($C_{int}$), a sample and hold capacitor 40 ($C_{S/H}$), and an averaging capacitor 42 ($C_{avg}$). The opposed plate of each capacitor is coupled to the photocurrent $I_{det}$ from the detector 22 (via node 38a) to output an integrated voltage 44 that is applied to the ADC circuit 28 of FIG. 1. Switches controlled by a sample/hold control node 46 and an averaging control node 48 are closed to couple the opposed plate of each capacitor 38, 40, 42 to the output node 44. When both switches are closed, the output voltage 44 integrates, preferably between 1.3V and 3.3V as shown (given $C_{int}$=800 fF, $C_{S/H}$=25 fF, and $C_{avg}$=200 fF, where 1 fF=$10^{-15}$ farads).

The compressor circuit 26 includes a single compression FET 50 coupled to a drain node 52 and a gate voltage control node 54; a bucket such as the integrating capacitor $C_{int}$ 38, and a current source $I_{det}$ 22, each of which are coupled to the FET source. As illustrated, the FET source is coupled to the integrating capacitor $C_{int}$ and the detector 22 (through node 22a), an opposed drain is coupled to the drain node 52, and a gate is coupled to the gate voltage control node 54. In operation, the FET allows the overall ROTC to capture signals that would otherwise be lost (due to over-loading the prior art ROIC's capacity to capture them) because the compression FET 50 allows a controlled bleed-off of current from the bucket ($C_{int}$ 50), as will be quantitatively shown in FIG. 3.

The compression FET 50 exhibits a threshold voltage $V_{thresh}$ above which the compression FET 50 conducts current towards its drain. When the voltage $V_{cap}$ on the integrating capacitor $C_{int}$ 38 exceeds that threshold voltage $V_{thresh}$, then current through the compression FET 50 (in saturation) is a function of the square of the difference between the threshold voltage $V_{thresh}$ and a voltage applied to the gate $V_{G-S}$ of the compression FET 50 at the gate voltage control node 54. The gate voltage control node 54 may be adapted to provide variable gate voltages for different uses of the detector and the array in which it may lie, though preferably only one gate voltage is applied at the control node 54.

Voltage on the integrating capacitor $V_{cap}$ is a function of the photocurrent $I_{det}$ being integrated. As voltage on the integrating capacitor $C_{int}$ 38 rises, the compression FET 50 allows voltage to be compressed or bled off from the integrating capacitor 38 as a square function. This is because the integrating capacitor $C_{int}$ is coupled to the source of the compression FET 50, and current flows through the compression FET 50 when the difference between the gate voltage $V_{G-S}$ and voltage at the source ($I_{det}$) exceeds the threshold voltage $V_{thresh}$. Mathematically, $I_{FET}=[V_{G-S}-V_{thresh}]^2$, where $I_{FET}$ represents current bled off through the compression FET 50. By adjusting the gate voltage $V_{G-S}$ applied to the gate of the compression FET 50 (at the control node 54), a designer or operator can control at what voltage or flux level the bleed off/compression begins.

In operation, a ramping (time varying) voltage is applied to one plate of the integrating capacitor $C_{int}$ 38 via node 34, and a photocurrent $I_{det}$ is applied to the opposed plate via the detector input node 22a, charging the integrating capacitor $C_{int}$ 38. As voltage across those two plates exceed a predetermined value, additional photocurrent $I_{det}$ is dumped at the compression circuit 26. The predetermined value is generally near but not at the voltage capacity of the integrating capacitor $C_{int}$ 38, and is specifically chosen to avoid a problem in the prior art where the detector 22 de-biases when the integrating capacitor on associated prior art read-out integrated circuitry is near fully charged. Dumping additional photocurrent $I_{det}$ occurs when the voltage at the source of the compression FET 50, which is the same as the voltage at the plate of the integrating capacitor $C_{int}$ 38 nearest the detector input node 22a (absent of intervening electrical components between that plate and the source), exceeds the gate voltage $V_{G-S}$ of the compression FET 50. It is noted that dumping of excess photocurrent $I_{det}$ occurs prior to the end of an integration cycle, that is, while the integrating capacitor $C_{int}$ 38 continues to build up charge (or at least prior to it dumping charge to begin the next integration cycle). During each integration cycle, an integrated voltage is output at node 44 to the ADC 28, which is preferably a single slope ADC that converts the integration voltage cycle to a count. These counts from each detector 22 in an array are accumulated in a grey counter, multiplexed 32, and converted to a display representing the scene radiation sensed by the array of detectors 22.

The gate voltage $V_{G-S}$ is set by the gate voltage control node 54, preferably by a circuit designer but potentially variable by an operator of a detector array based on desired use. The latter instance may be viable when more than one detector 22 (or a single detector capable of sensing multiple spectral bands) are coupled to the same ramp and integrate 24 and compression 26 circuits, and the operator selects which spectral band to sense at a given instant. The selection tunes the gate voltage $V_{G-S}$ to a different cutoff voltage (see FIG. 3) based on the desired band.

As above, this compression or bleeding off is according to a squared differential, making it particularly efficient for a unit-cell deployment in an imaging array. That the compression circuit 26 is essentially a single MOSFET 50 with variable control 54 is a particularly elegant design that is prone to less operational or manufacturing errors than more complex compression circuitry. This is particularly useful in conjunction with a programmable gain array, as varying the gate voltage $V_{G-S}$ allows an operator or designed to select how much dynamic range voltage is to be compressed. It also solves a particularly vexing problem in that it keeps the detector 22 from de-biasing when the integrating capacitor $C_{int}$ 38 is near to being fully charged.

It is a novel aspect of this invention that the ramping voltage, input at node 34, is applied to the lower plate of the unit cell capacitor $C_{int}$ 38, and the compression FET 50 is coupled directly to the opposed upper plate. It is a particular advantage that the present compression circuit 26 comprises a single FET 50, so that it may be deployed at the unit-cell level of an array of unit cells, where each unit cell includes one detector 22 (though one detector may sense more than one wavelength band). Deploying the compression circuitry 26, the ramp and integrate circuitry 24, and the ADC 28 at the unit cell level enables the electronics of such an array to be massively paralleled. The single compression FET 50 enables low power consumption and alleviates much of the heat generation problems previously frustrating prior attempts to deploy more electronics at the unit cell level.

Figure 3:
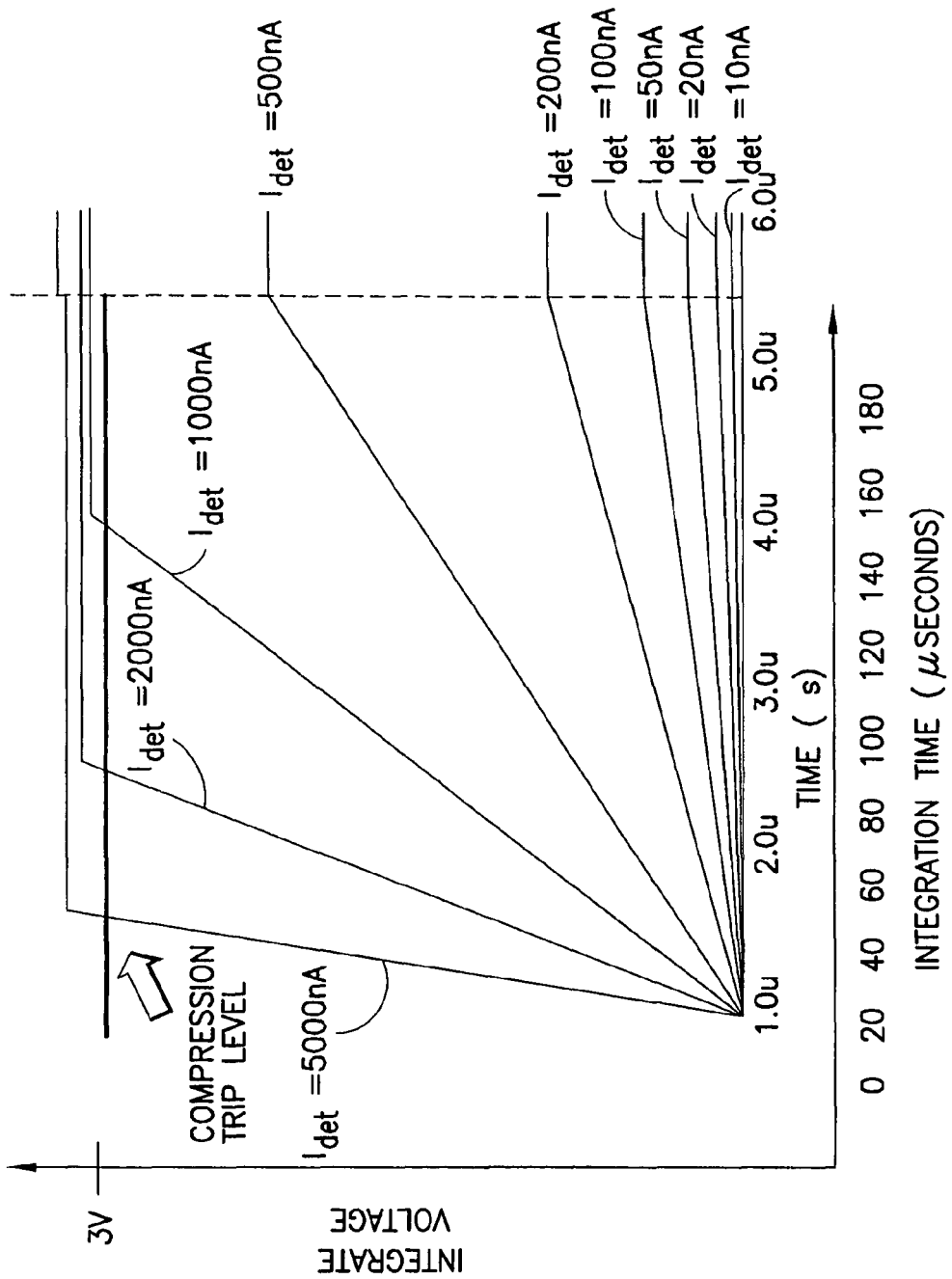
FIG. 3 is a graph showing integration voltage at various integration times for nine different input currents to an integrating capacitor.

FIG. 3 is a graph showing integration voltage at various integration times for identical integrating capacitors operating on nine different current source values $I_{det}$, spanning 10 nA to 5000 nA (nanoAmps) as labeled. The gate voltage $V_{G-S}$ of the compression FET 50 is set at 3.0 volts. As is evident, current begins to bleed off at about 3 V for each of these situations, the threshold voltage being selected to achieve that same result for the different detector currents plotted. In the case of the 5000 nA detector current, the capacitor fills rapidly (about 20 nsec) and the compression begins. Lower detector currents of course fill the same size capacitor slower, but as it fills, current is bled off/compressed above about 3 V. This compressed current is captured and the overall ROIC in which the compression circuit lies can then extract information from it, as opposed to the prior art in which this current was lost once the capacitor was nearly filled and the detector de-biased in response. At the far right of FIG. 3 is an ending voltage at which integration has stopped (about 300 μsec, as FIG. 3 is not to scale beyond 180 μsec). Evan at this late time, the higher photocurrents (1000 nA, 2000 nA, and 5000 nA) remain compressed and suitable for processing by the remaining portions of the overall ROIC.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes may be made therein without departing from the scope and spirit of the invention as set forth above.

What is claimed is:

1. A circuit comprising: a compression sub-circuit comprising a transistor and having an input and an output for dumping excess current;
a voltage bucket and a current source coupled in parallel to the input of the compression sub-circuit, wherein the voltage bucket comprises at least one capacitor, wherein the at least one capacitor has a first plate coupled to the input of the voltage bucket and an opposed second plate coupled to a ramping voltage circuit, wherein the excess current is dumped when voltage across the first plate and the second plate exceeds voltage at a gate of the transistor; and wherein the ramping voltage circuit provides a voltage ramping between 3.5 and 5.75 V.

2. The circuit of claim 1 wherein the transistor exhibits a gate voltage such that all current from the current source passes to the transistor drain once the bucket is substantially full.

3. The circuit of claim 1 wherein the transistor comprises a metal oxide semiconductor field effect transistor MOSFET.

4. The circuit of claim 1, wherein the said transistor is characterized by a variable gate voltage.

5. The circuit of claim 1 characterized in that the compression sub-circuit is designed such that all current from the current source that is not accumulated at the bucket passes to the output of the compression sub-circuit.

6. The circuit of claim 1, wherein an output voltage of the circuit integrates between 1.3 V and 3.3 V.

7. The circuit of claim 1, wherein the excess current is dumped while the at least one capacitor builds up a charge.

8. A circuit comprising: an input node for providing an electrical current; storage means coupled to the input node for storing a finite amount of electrical energy; bleedoff means comprising a transistor having an input coupled to the input node and the storage means for dumping current when the storage means is substantially full, wherein the storage means comprises at least one capacitor with a first plate coupled to the input node and a second plate coupled to a ramping voltage circuit; wherein the bleedoff means is for dumping the current when voltage across the first plate and the second plate exceeds voltage at a gate of the transistor; and wherein the ramping voltage circuit provides a voltage ramping between 3.5 and 5.75 V.

9. An array of unit cells disposed on a contiguous substrate, each unit cell comprising: a photocurrent input node; a capacitor having a first plate coupled to the photocurrent input node; a compression sub-circuit comprising a transistor coupled to the capacitor first plate for bleeding off current from the photocurrent input node at least when the capacitor is fully charged when voltage across the capacitor first plate and an opposed second plate exceeds voltage at a gate of the transistor; and a ramping circuit having an output coupled to the opposed second plate of the capacitor; wherein the ramping circuit provides a voltage ramping between 3.5 and 5.75 V.

10. The array of unit cells of claim 9, wherein the transistor comprises a source coupled to the capacitor first plate.

* * * * *